(12) United States Patent
Ramsaran et al.

(10) Patent No.: US 12,719,406 B2
(45) Date of Patent: Aug. 25, 2026

(54) PULL CLAMP FOR A SOLAR PANEL RACK

(71) Applicant: KB Racking Inc., Toronto (CA)

(72) Inventors: Kevin Ramsaran, Toronto (CA); Sebastian Seyfarth, Toronto (CA)

(73) Assignee: KB Racking Inc., Toronto (CA)

( * ) Notice: Subject to any disclaimer, the term of this patent is extended or adjusted under 35 U.S.C. 154(b) by 0 days.

(21) Appl. No.: 18/468,691

(22) Filed: Sep. 16, 2023

(65) Prior Publication Data

US 2024/0097608 A1 Mar. 21, 2024

Related U.S. Application Data

(63) Continuation of application No. 29/866,551, filed on Sep. 17, 2022, now Pat. No. Des. 1,026,800.

(60) Provisional application No. 63/376,082, filed on Sep. 17, 2022.

(51) Int. Cl.

| | |
|---|---|
| ***F16B 2/20*** | (2006.01) |
| ***F16B 2/06*** | (2006.01) |
| ***F16B 2/24*** | (2006.01) |
| ***F16M 13/02*** | (2006.01) |
| ***H02S 20/00*** | (2014.01) |
| ***H02S 30/00*** | (2014.01) |
| ***H02S 30/10*** | (2014.01) |

(52) U.S. Cl.

CPC ................ *H02S 30/00* (2013.01); *F16B 2/06* (2013.01); *F16B 2/065* (2013.01); *F16M 13/02* (2013.01); *H02S 20/00* (2013.01); *H02S 30/10* (2014.12); *F16B 2/20* (2013.01); *F16B 2/243* (2013.01); *F16B 2/245* (2013.01)

(58) Field of Classification Search

CPC ............. F16B 2/20; F16B 2/243; F16B 2/245
USPC .............................. 248/228.8, 231.81, 316.7
See application file for complete search history.

(56) References Cited

U.S. PATENT DOCUMENTS

| | | | | |
|---|---|---|---|---|
| 3,900,998 A * | 8/1975 | Hubbard | F16B 2/04 | 411/60.1 |
| 5,039,264 A * | 8/1991 | Benn | F16B 37/041 | 411/523 |
| 6,513,772 B2 * | 2/2003 | Gary | F16B 13/08 | 248/231.91 |
| 9,918,357 B2 * | 3/2018 | Li | F24C 7/067 | |
| 10,047,783 B2 * | 8/2018 | Mills | F16B 37/044 | |
| 10,125,801 B2 * | 11/2018 | Wilson | F16B 7/042 | |
| 2005/0162817 A1 * | 7/2005 | Miller | H02B 1/21 | 174/68.2 |

(Continued)

*Primary Examiner* — Alfred J Wujciak
(74) *Attorney, Agent, or Firm* — Tatonetti IP

(57) ABSTRACT

A customizable solar panel rack is configured with connectible rails, a bottom support member, and a height-adjustable top support member to accommodate and thereby operate with different shapes and sizes of solar panels. Typically, the various components of the solar panel rack may be comprised of a metal, such as galvanized steel, titanium etc., but other suitable materials may also be possible. The top and bottom support members have two legs extending from their bottom to engage and attach to corresponding arms on a rail. The top and bottom support members each have a pull clamp that secures the solar panel to the top and bottom supports. A pull clamp bolt or screw engages with a threaded bore on the bottom and top support members, which then engages with an access hole on the pull clamp to secure the pieces together.

9 Claims, 17 Drawing Sheets

(56) References Cited

U.S. PATENT DOCUMENTS

| | | | | |
|---|---|---|---|---|
| 2012/0241574 | A1* | 9/2012 | Uota | E04F 13/0846<br>248/231.81 |
| 2014/0137449 | A1* | 5/2014 | English | G09F 23/00<br>248/231.81 |
| 2020/0145522 | A1* | 5/2020 | Liu | F16M 11/14 |
| 2022/0095471 | A1* | 3/2022 | Tzeng | F16B 2/245 |
| 2023/0228348 | A1* | 7/2023 | Wouters | F16L 3/13<br>248/200 |

* cited by examiner $215_1$
$215_2$
415
415
405
405
410
405
415
$215_1$
$215_2$ 405
415
305
335
315
310
305
335
315

Electrical connection
Teeth (715)
505
Module flange
Flange connector (1435)
Hooks in place at nook 545
Middle connector (1440)
540
Tab (1430)
220
Module flange (1415)
Teeth (715)
1425
535
210
Support member connector (1445)
220
205
1405
1410
1435
1430
540
1440
1425
505
1445
535
Teeth (1420)
Module flange (1415)

220
1410
105
220
1410
105
220
1410
105
220
1410
105

205
210
205
205
1405
1410
1405
$105_{1-n}$

PULL CLAMP FOR A SOLAR PANEL RACK

CROSS-REFERENCES TO RELATED APPLICATIONS

This Non-Provisional Utility patent application claims the benefit of and priority to Provisional Patent Application Ser. No. 63/376,082, filed Sep. 17, 2022, entitled "Solar Panel Rack," the entire contents of which are hereby incorporated herein by reference. This Non-Provisional Utility patent application claims the benefit of and priority to Design Patent Application Serial No. 29/866,551, filed Sep. 17, 2022, entitled "Solar Panel Rack," the entire contents of which are hereby incorporated herein by reference.

BACKGROUND

Solar panels latch onto dedicated solar panel racks to secure them in place for long-term use. Solar panels can come in various shapes and sizes, making certain solar panel racks difficult to use with a given manufacturer's solar panels.

SUMMARY

A customizable solar panel rack is configured with connectible rails, a bottom support member (hereinafter interchangeably referred to as a "bottom support" or "bottom support member"), and a height-adjustable top support member (hereinafter interchangeably referred to as a "top support" or "top support member") to accommodate and thereby operate with different shapes and sizes of solar panels. Typically, the various components of the solar panel rack may be comprised of a metal, such as galvanized steel, titanium etc., but other suitable materials may also be possible. The top and bottom support members have two legs extending from their bottom to engage and attach to corresponding arms on a rail. A user applies downward pressure on the top and bottom support, so the respective legs outwardly bend and then wrap around the rail's arms. As rails can be connected to each other to increase length, the top and bottom support members may be attached to the same or different aligned rails. Both supports can be laterally moved on the rail even while attached so they can be properly positioned based on the size of the solar panel.

The top support member has a static sleeve positioned on its bottom—to which the legs are attached—and an adjustable upper support that slidably engages with the static sleeve's interior channel. A screw and bolt enter through a threaded bore in the static sleeve, which uses the upper support to secure them together once a desired height is selected.

The top and bottom support members each have a pull clamp that secures the solar panel to the top and bottom supports. For the top support, the pull clamp attaches to the adjustable upper support. A pull clamp bolt or screw engages with a threaded bore on the bottom and top support members, which then engages with an access hole on the pull clamp to secure the pieces together. The pull clamps move laterally toward and away from the top and bottom support members to accommodate different shaped and sized solar panels and to enable a user to loosen and remove the screw to disassemble the solar panel from the top and bottom supports. When assembling the pull clamps and top and bottom support members to a solar panel, a press-fitted nut engages with the opposing end of the pull clamp bolt to fully secure and tighten the structure together. The press-fitted nut may be pre-installed, such as welded, to an access hole that aligns with the pull clamp bolt when inserted into a bore on the top support.

Multiple solar panels and solar panel racks can be assembled, depending on the specific use and the amount of electricity desired for a given consumer. By creating rails that can connect together, a top support that is height-adjustable, and a pull clamp that is also adjustable, a single solar panel rack assembly can accommodate a variety of different solar panels. Such a customizable system makes assembly easier and creates a universal solution in the solar panel industry.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
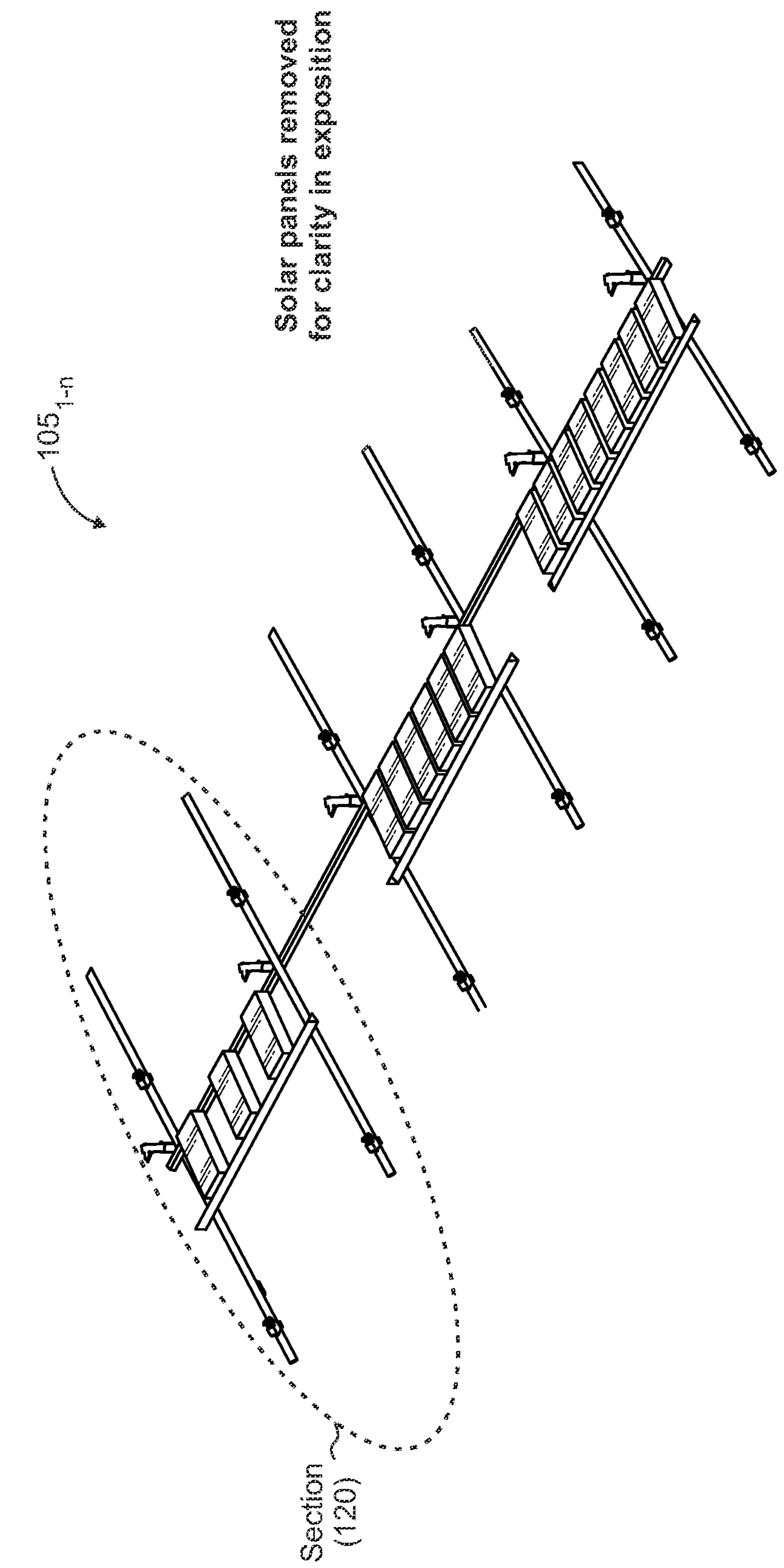
FIG. 1 shows an illustrative representation of a series of solar panel racks with the solar panel or module removed for clarity in exposition.

FIG. 1 shows an illustrative representation in which a series of solar panel racks 105 are arranged to hold solar panels or modules. Each solar panel rack that attaches to a solar panel uses a series of components that enable a customizable solution to accommodate an array of different shaped and sized solar panels—thereby making the solar panel rack universal among manufacturers. In FIG. 1, the solar panels are unshown for clarity in exposition. Typically, the various components of the solar panel rack, such as the support members, pull clamps, fasteners, etc., may be comprised of a metal, such as galvanized steel, titanium etc., but other suitable materials may also be possible depending on the implementation. For example, other materials, such as plastic, may be used to reduce short-term costs, but this may require further updating to offset wear and tear.

Figure 2:
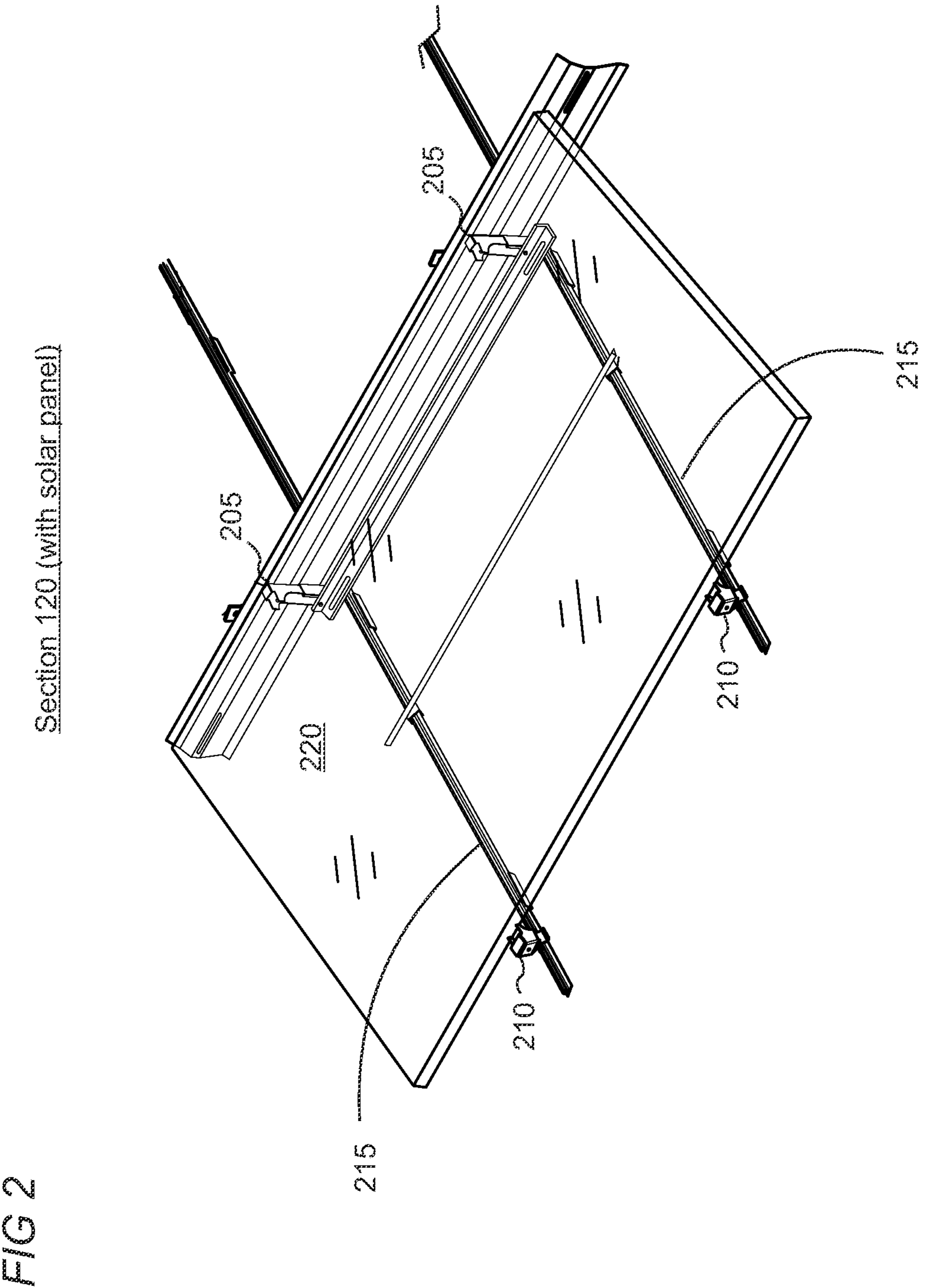
FIG. 2 shows an illustrative representation of a single solar panel rack with a solar panel attached thereto.

FIG. 2 shows an illustrative representation of section 120 from FIG. 1, which focuses on the components, setup, and arrangement of a single solar panel rack 105 with a solar panel 220 attached thereto. In typical implementations, the solar panel rack 105 includes a rail 215 that operates as a base for the rack, a top support member 205, and a bottom support member 210, in which both support members attach and clip to a rail 215. The specifics of each component are further described in greater detail below. Once the top and bottom support members are attached to the rail, the solar panel 220 is secured using pull clamps on each top and bottom support member. Many facets of the solar panel rack are customizable and adjustable to enable the rack to operate with a plethora of solar panels having different shapes and sizes.

Figure 3:
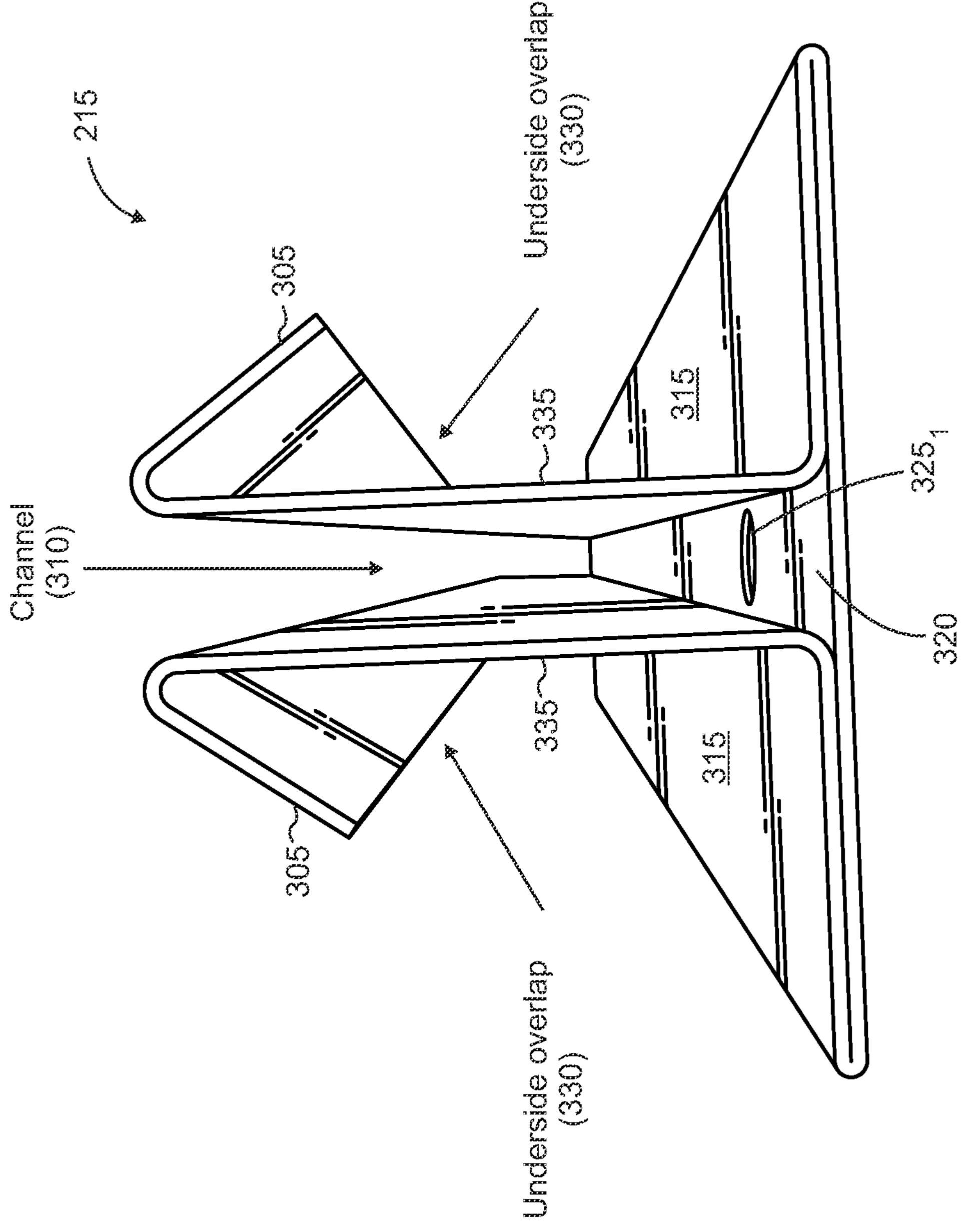
FIG. 3 shows an illustrative representation of a rail that functions as a base for an assembled solar panel rack.

FIG. 3 shows an illustrative representation in which a rail 215 is configured with opposing arms 305, which are split by a center channel 310 down a longitudinal axis of the rail. The arms have some bendability to enable the legs on the bottom and top support members to hook to the arm's underside overlap 330 (FIGS. 7A-B, 12, 13). The bent section of the arms, for example, may have less steel and be configured slightly weaker to enable bending. Essentially, the legs on the bottom and top support members overlap with the arms. The rail has a base 315 on each arm side and a channel base 320 on which a bore 325 is present to enable connecting multiple rails together. The base forms a substantially flat plane, from which a vertical section 335 is substantially orthogonal to the base 315. As shown, the bases 315 are separated by a channel 310, but the bases rest on another layer underneath. The legs bend at an acute angle relative to the vertical section 335. The hole receives a bolt that attaches to a splice that attaches two aligned rails together (FIG. 4B). The subscript "1" for hole 325 represents that a second hole may be positioned on the other end of the rail to enable connecting multiple rails together on either side. In that regard, the rail is symmetrical.

Figure 4A:
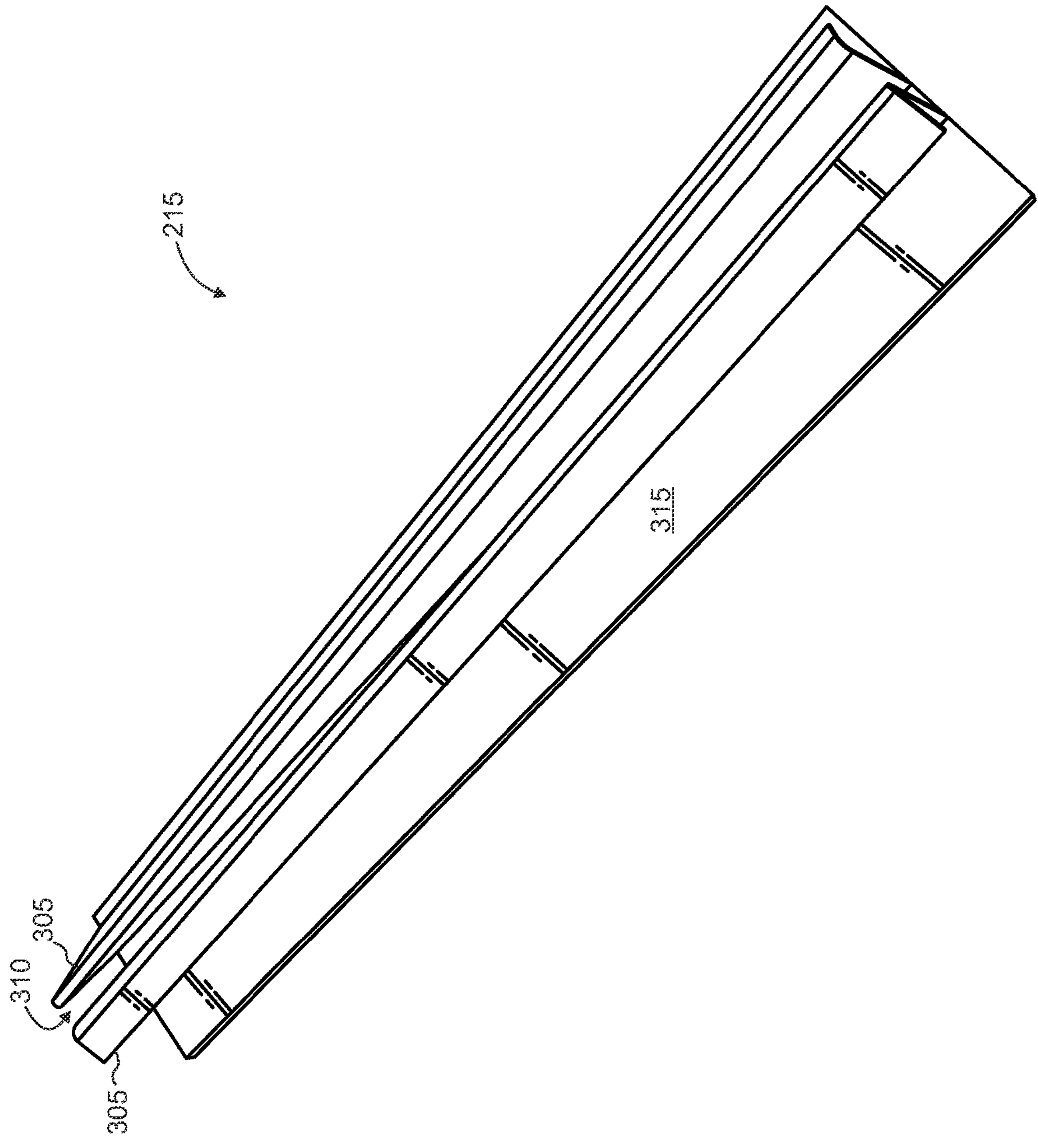
FIG. 4A shows an illustrative representation of a single rail.
Figures 4B, 4C:
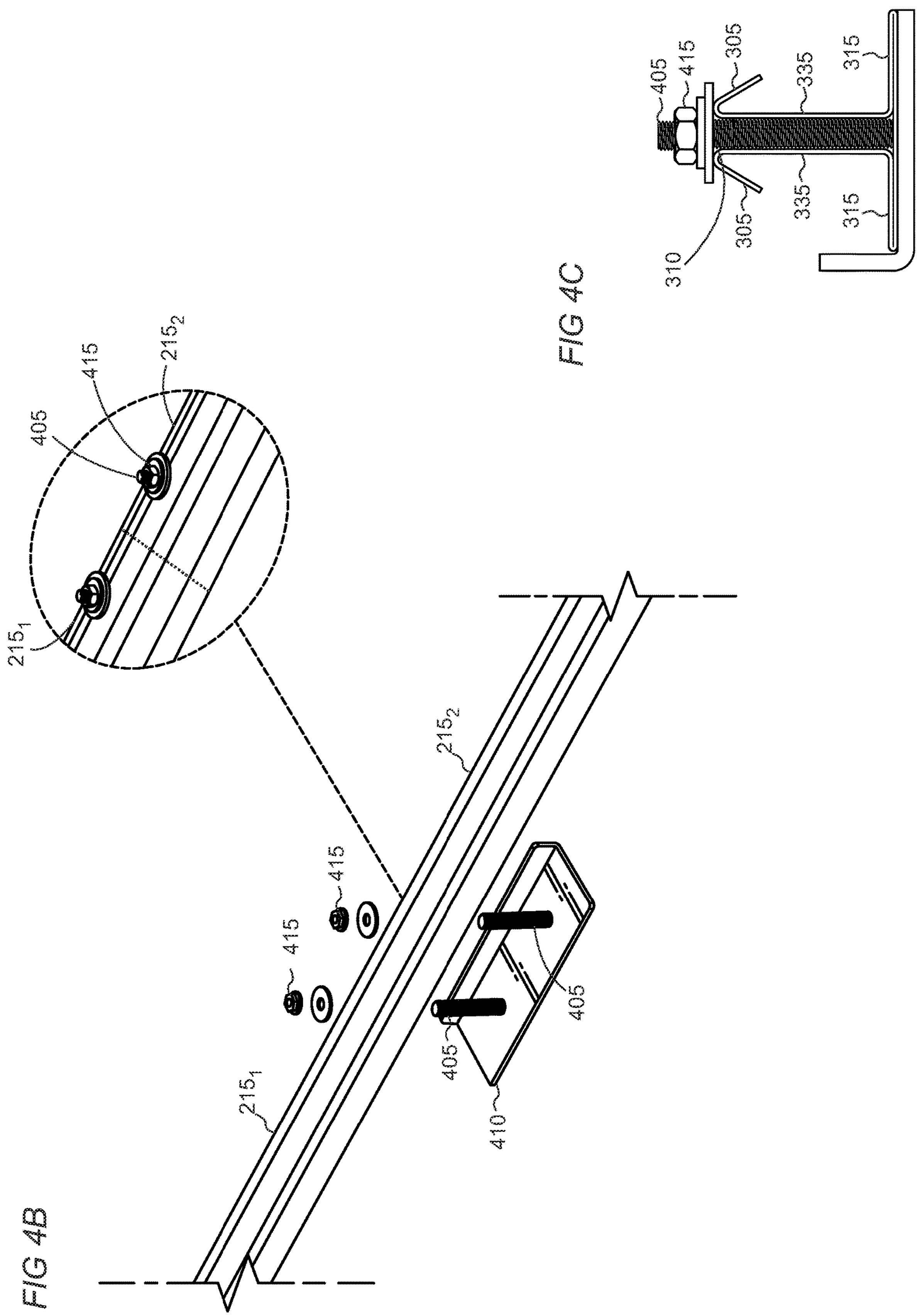
FIG. 4B shows an illustrative representation of two rails being secured together using a splice.
FIG. 4C shows an illustrative representation in which a stud enters the rail's channel.

FIGS. 4A-C show illustrative representations of the rail 215 in which a splice 410 is used to secure multiple rails together. The exemplary rail shown in FIG. 4A may be longer or shorter depending on the specific implementation. The splice 410 has two protruding bolts 405 extending upward therefrom to connect to the holes 325 on the respective rails. Holes 325 (FIG. 3) may be positioned adjacent to both ends of the rails so that rails can be connected on both ends thereof. The holes may be, for example, anywhere from a centimeter to three or four inches from the rail's end.

Rails $\mathbf{215}_1$ and $\mathbf{215}_2$ represent two distinct rails 215 attached together using the splice 410. The dotted line in FIG. 4B represents the separation point between the two rails. Bolts 405 respectively enter the holes 325 on each rail to attach them together, and then nuts 415 are tightened to fully secure the rails together and in place. As shown in FIG. 4C, the size of the bolts 405 corresponds to the rail's channel's size so there is a snug fit between the bolts and the channel's vertical section 335.

Figure 5:
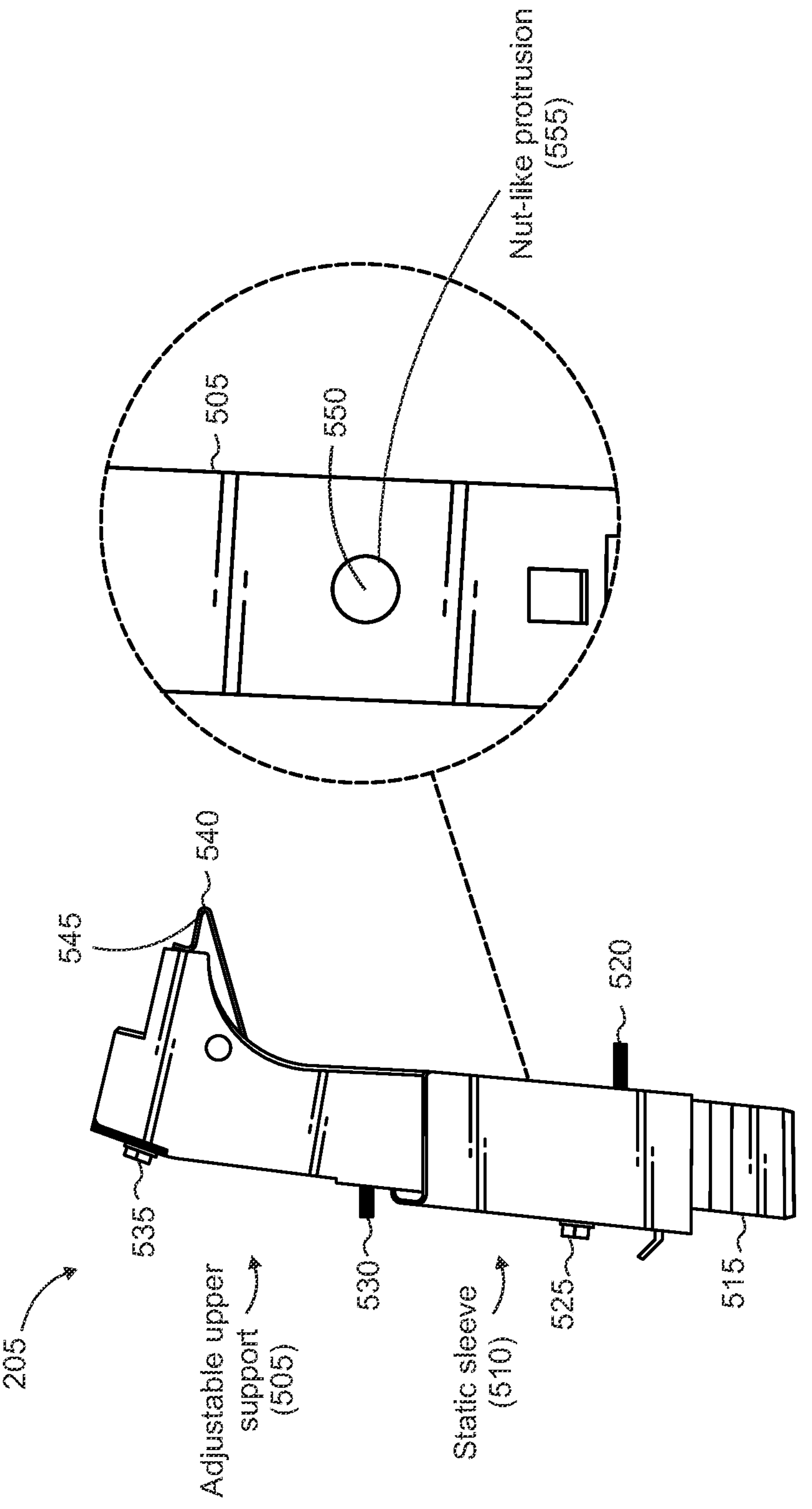
FIG. 5 shows an illustrative representation of an upper support member.

FIG. 5 shows an illustrative representation in which the top support member 205 is configured with an adjustable upper support 505 and a static sleeve 510 to which the adjustable upper support engages. The windshield stud 530 is used for latching and securing, via a nut, a windshield to adjacent top supports. The ballast tray stud is used for latching and securing, via a nut, a ballast tray to two adjacent top supports and allows the ballast tray to rest on two adjacent rails. The adjustment bolt 525 goes through an elongated opening (not shown in FIG. 5) in the static sleeve 510 which enters a corresponding threaded adjustment hole 550 in the adjustable upper support 505 to fix the upper support in place. The adjustment hole may have an additional component operating as a nut-like protrusion 555 to strengthen the connection and structure. The adjustment hole moves along the elongated opening on the static sleeve to enable height adjustment. The adjustable upper support also includes a pull clamp bolt 535 that engages with and connects to the pull clamp 540. The pull clamp's nook 545, as discussed in greater detail below, clamps onto a solar panel's flange to secure the solar panel to the solar panel rack's structure. The static sleeve includes legs 515 that engage with the rail's arms 305 and their respective underside overlaps 330. Specifically, the arms' ends engage with the legs' inside portion once the arms get past the leg's innermost point.

Figure 6:
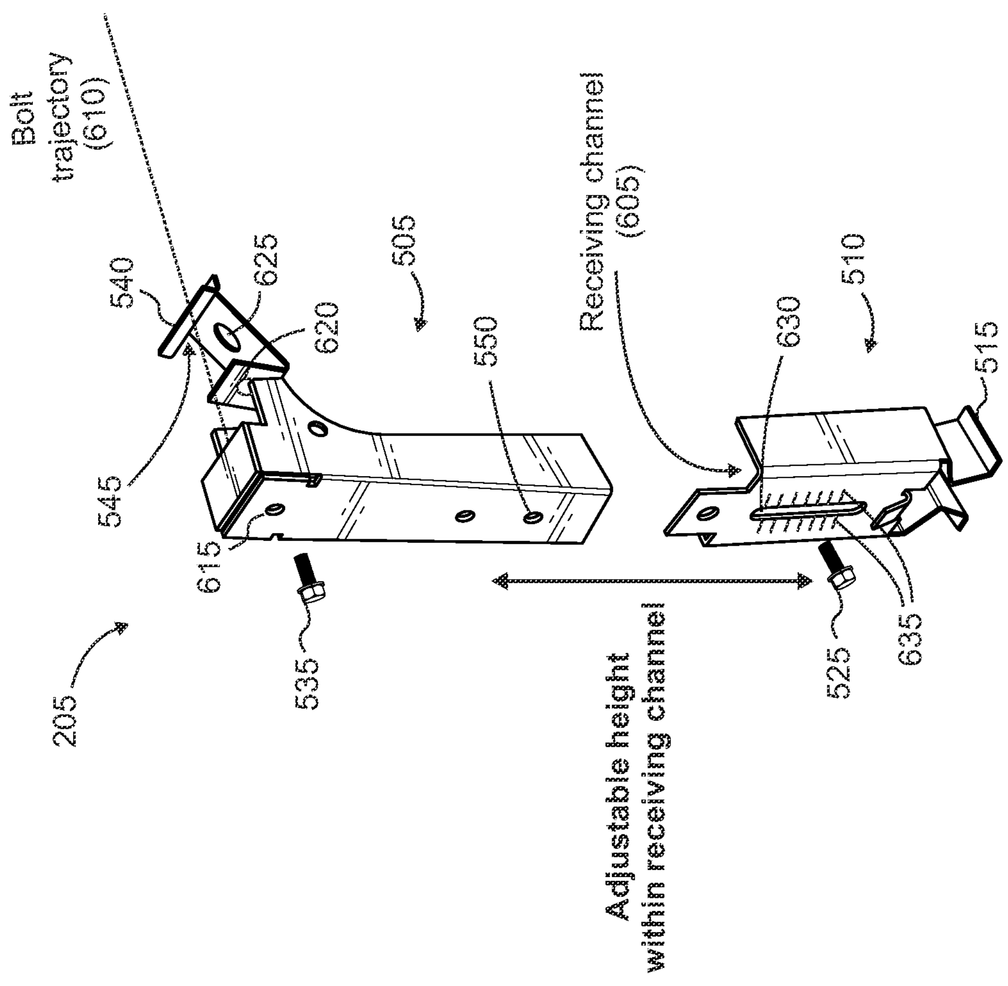
FIG. 6 shows an illustrative representation of an adjustable upper support aligned with a channel on a static sleeve.

FIG. 6 shows an illustrative representation of the top support member's adjustability in terms of its height and the pull clamp's inward-outward give. For example, the static sleeve 510 includes a receiving channel 605 in its interior into which the adjustable upper support 505 slidably inserts. As shown, the adjustable upper support slides upward and downward within the receiving channel to enable a user to customize the top support member's height to accommodate different solar panels 220. Such height adjustability also makes it easier to latch a solar panel to the solar panel rack 105 by providing a user with some leeway and adaptability during installation. The adjustment bolt 525 enters the elongated opening 630 which allows the user to adjust the bolt's placement, thereby increasing or decreasing the height of the top support member 205. The adjustment bolt 525 enters through the elongated opening 630 and tightens to the threaded adjustment hole 550 to secure the adjustment bolt in place and the components together. The adjustment hole 550 in the adjustable upper support 505 may also have a nut-like protrusion on the inside to provide additional surface area and strength to the connection. The nut-like protrusion may be welded to or otherwise a part of the adjustable upper support and may extend anywhere from millimeters outward to 4-5 centimeters, depending on the implementation. The rear surface of the static sleeve 510 also includes notches 635, which guides the user when positioning the adjustment bolt's position along the elongated opening 630. The notches 635 may provide, for example, some aid in securing the bolt in place before and while the user tightens the bolt.

The pull clamp 540 is a distinct component from and connects to the adjustable upper support 505 and is used to attach and secure a solar panel 220 to the top support member 205. The pull clamp bolt 535 engages with a bore

Figure 14:
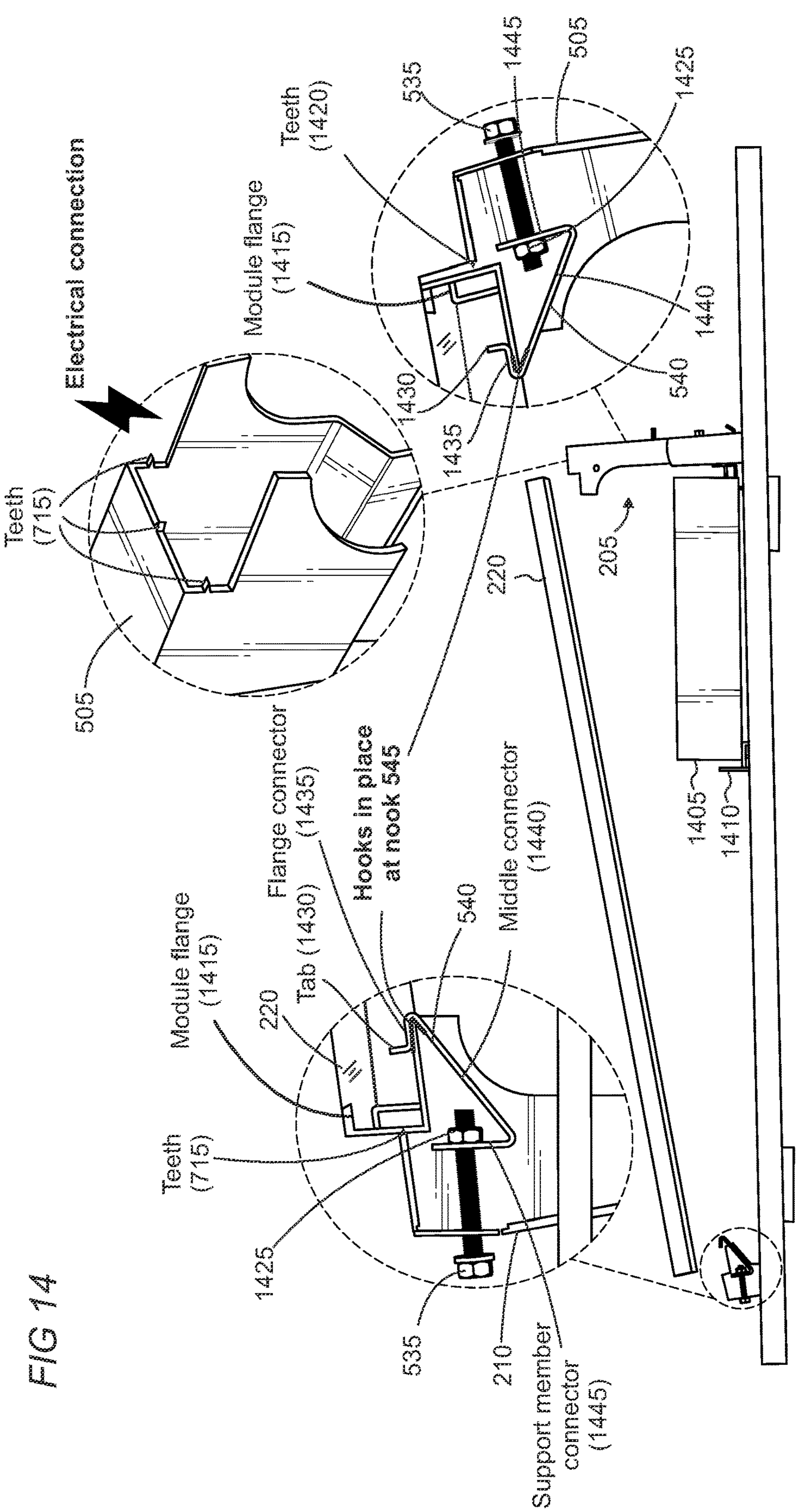
FIG. 14 shows an illustrative representation in which the respective pull clamps on the top and bottom support members engage with the flange on the solar panel to secure the solar panel in place.

615 on the adjustable upper support to engage with a corresponding hole 620 on the pull clamp. The dotted line in FIG. 6 shows an exemplary trajectory of the pull clamp bolt, as representatively shown by numeral 610. The pull clamp bolt extends through to the pull clamp's hole 620, and once the solar panel's flange is engaged with the nook 545 of the pull clamp, a press-fit nut or other nut is secured to the opposite end of the pull clamp bolt 535 to fully secure the solar panel in place (FIG. 14). The access hole 625 may be used to access the bolt to put on, tighten, or loosen the nut on the bolt's opposite side. Alternatively, the access hole 625 has a pre-installed press-fit nut that that pull clamp bolt threads, or a nut can be used to engage with the access hole and the pull clamp's surface.

Figure 7A:
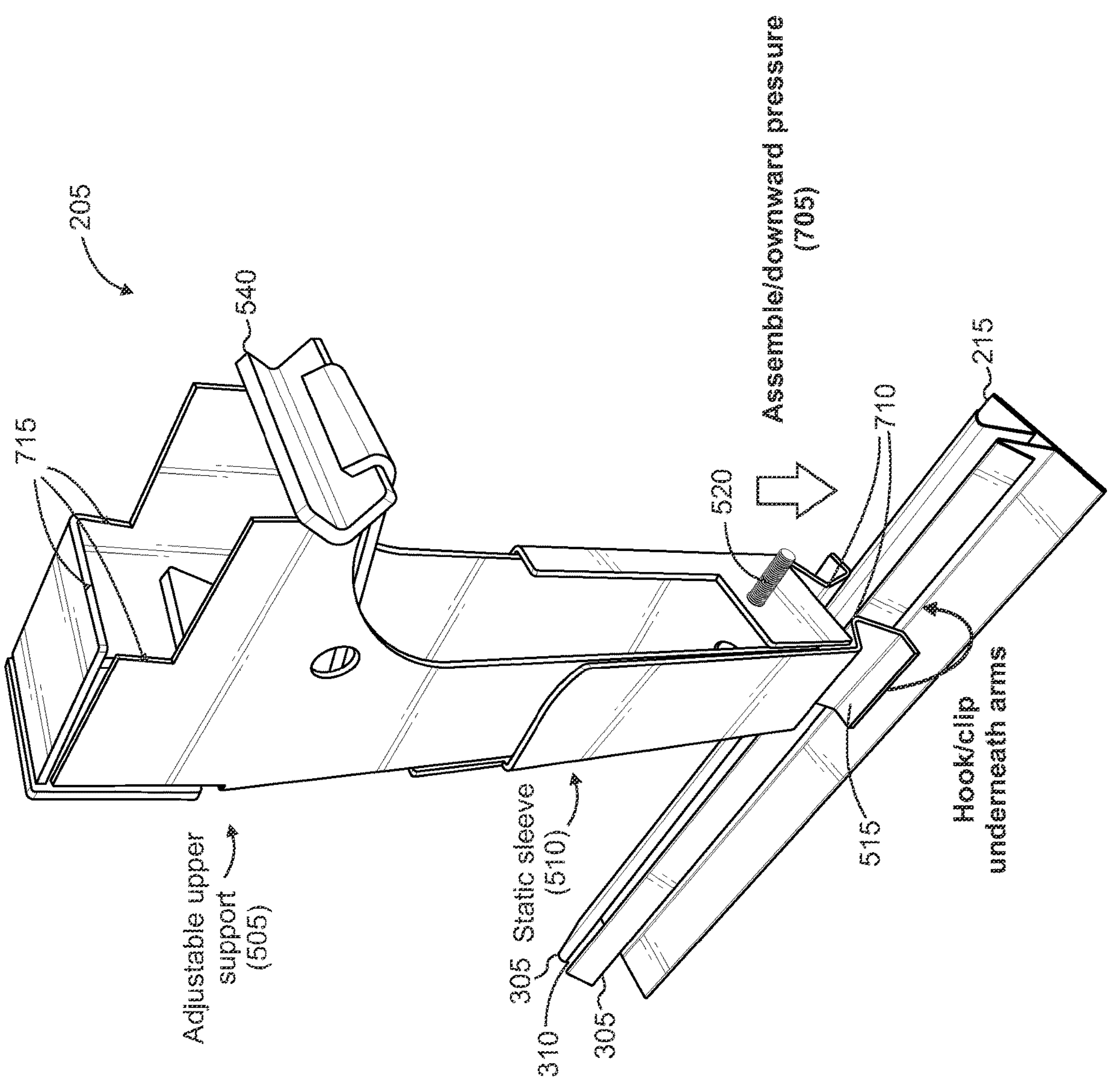
FIGS. 7A and 7B show illustrative representations of legs on the static sleeve engaging and clipping into the rail's arms.
Figure 7B:
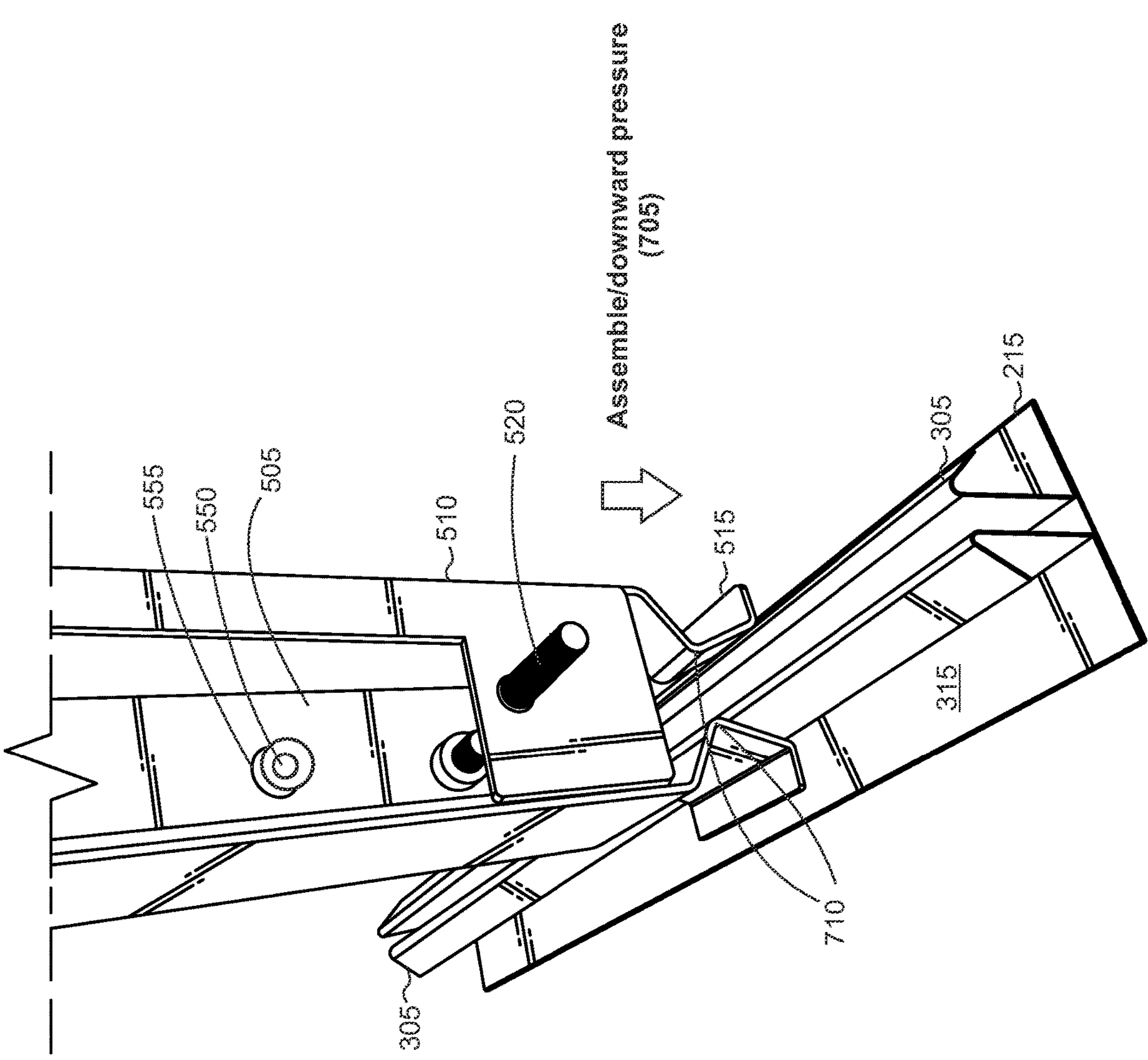

FIGS. 7A and 7B show illustrative representations in which the top support member's legs 515 each respectively engage with the rail's arms 305 to securely connect and attach the top support member 205 in place. When assembling the solar panel rack 105, the user may apply downward pressure 705 on the top support until the legs and arms engage, and the static sleeve's legs engage with the arm's underside overlaps 330 (FIG. 3). Specifically, the leg's innermost point 710 extends beyond, with sufficient pressure, the arm's ends so that the arms then interlock with and secure in place with the inside portion of the legs. Once the top support member is connected to the rail, which serves as a base, the top support member is capable of holding a solar panel 220. FIG. 7A also shows the adjustable upper support's teeth 715, which, as discussed in greater detail below (FIG. 14), pierce the solar panel's aluminum flange and then pierce the solar panel itself to create an electrical connection.

Figure 8:
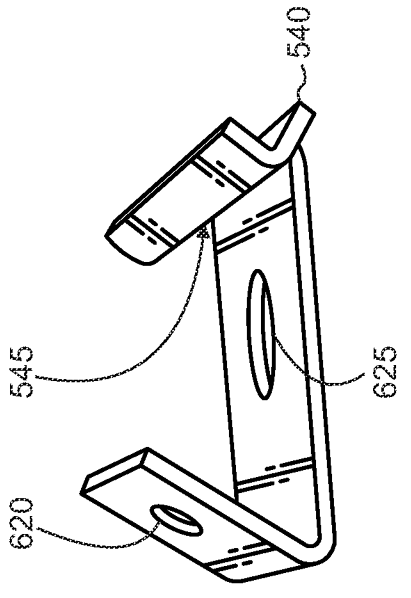
FIG. 8 shows an illustrative exploded representation of a bottom support member aligned with a pull clamp.
Figure 8:
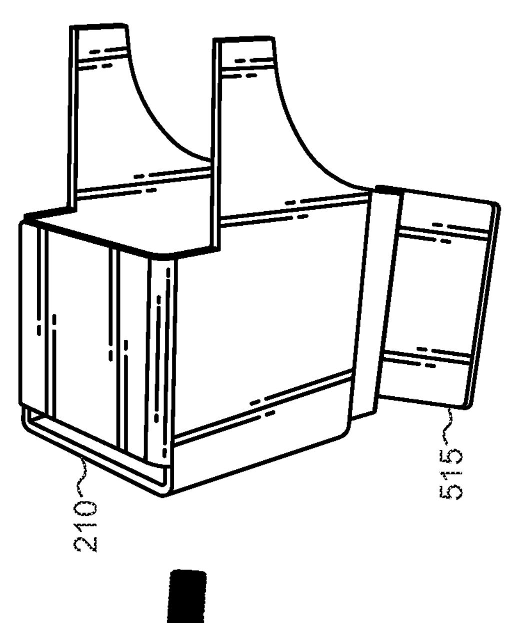
Figure 8:

FIG. 8 shows an illustrative exploded representation of the bottom support member 210 aligned with a pull clamp 540. The bottom support's pull clamp is substantially the same as the top support member's pull clamp and is likewise configured with the hole 620 to receive the pull clamp bolt 535, the access hole 625, and the nook 545 that engages with a solar panel's flange. Essentially, the bottom support member 210 is configured similarly to the top support member 205 in regards to functioning with the pull clamp 540. Furthermore, the bottom support has opposing legs 515 that respectively engage with the arms 305 on the rail 215 (FIG. 3), similar to the top support's functionality discussed above.

Figure 9:
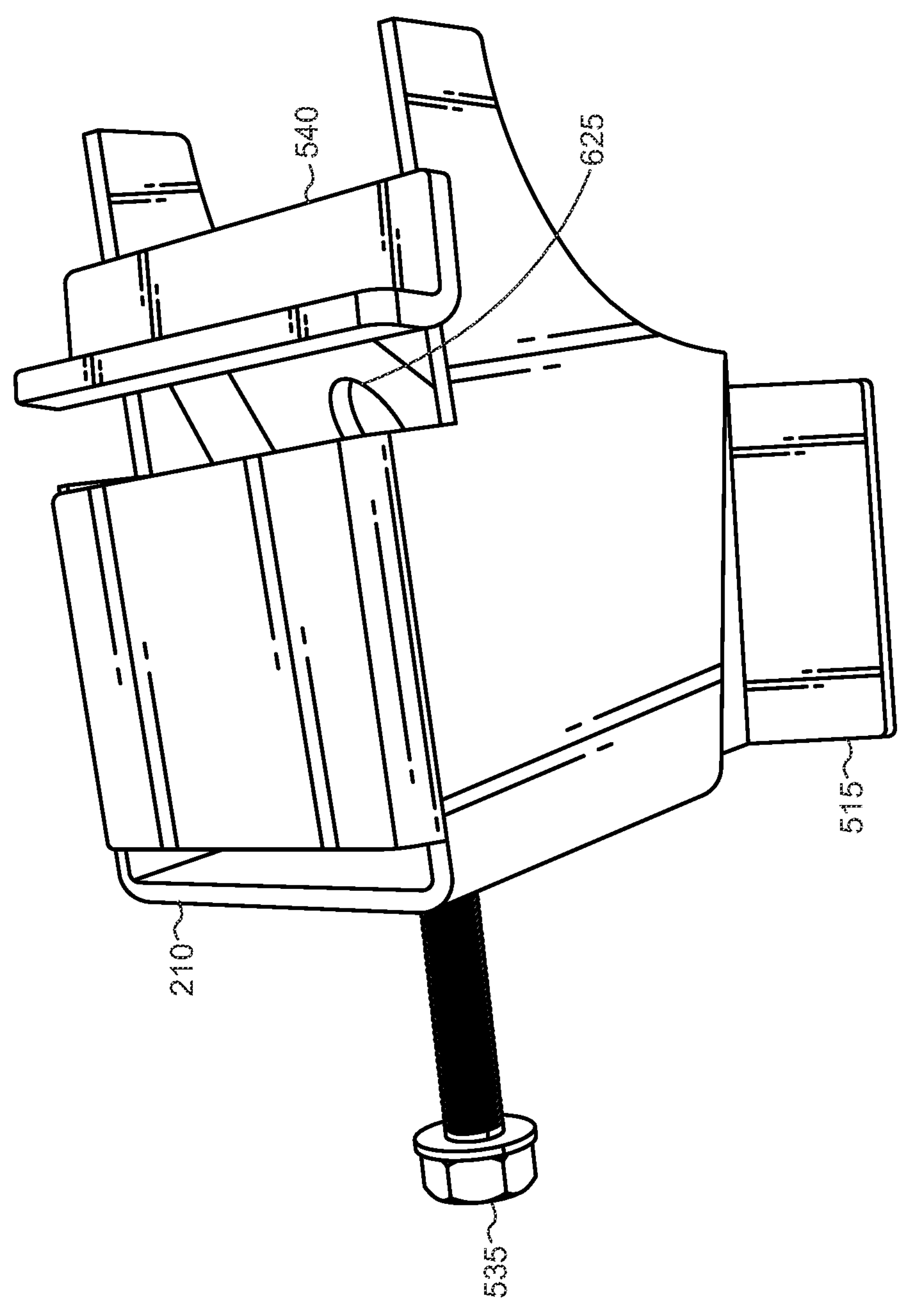
FIGS. 9-11 show various illustrative representations of the pull clamp's adjustable positioning relative to the bottom support.
Figure 10:
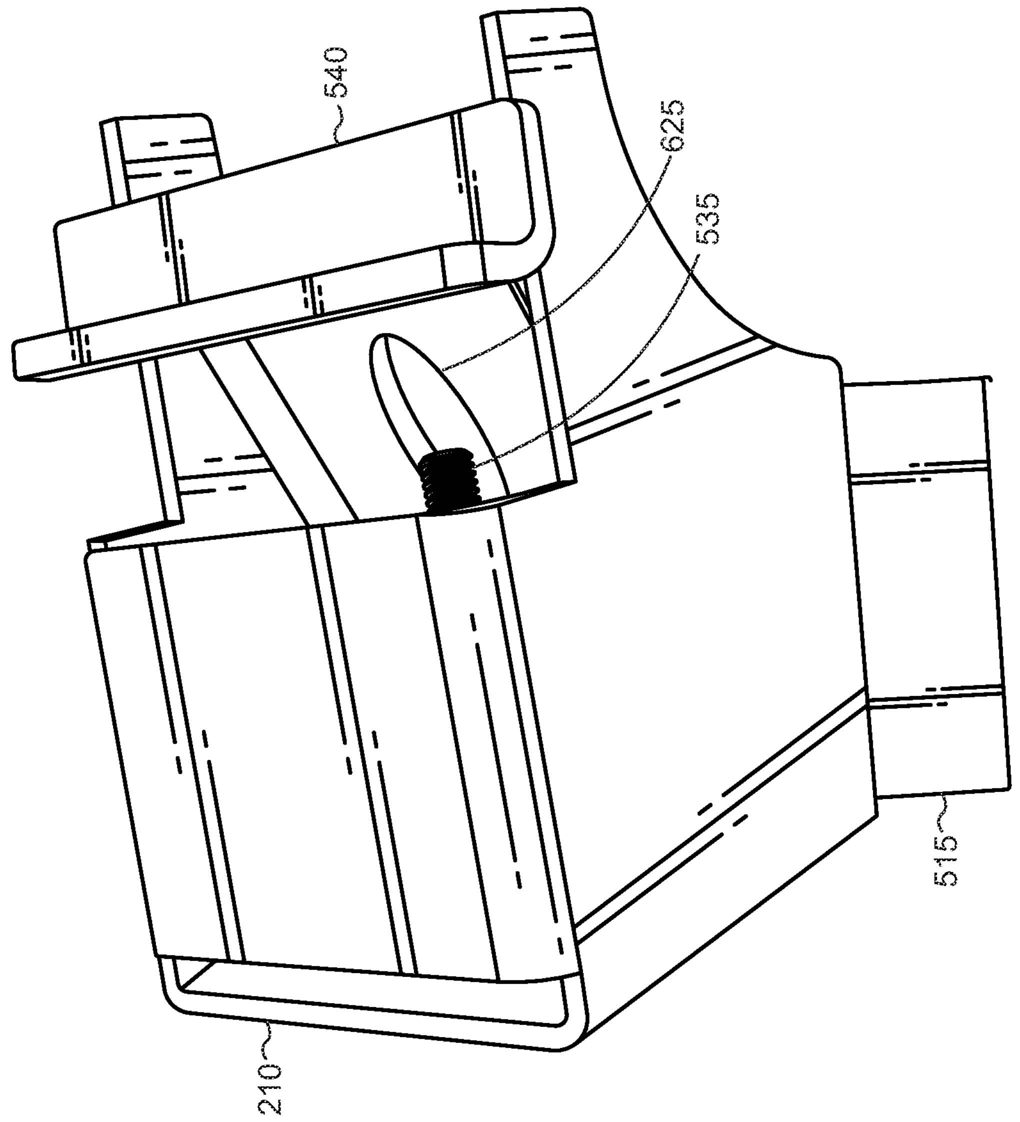
Figure 11:
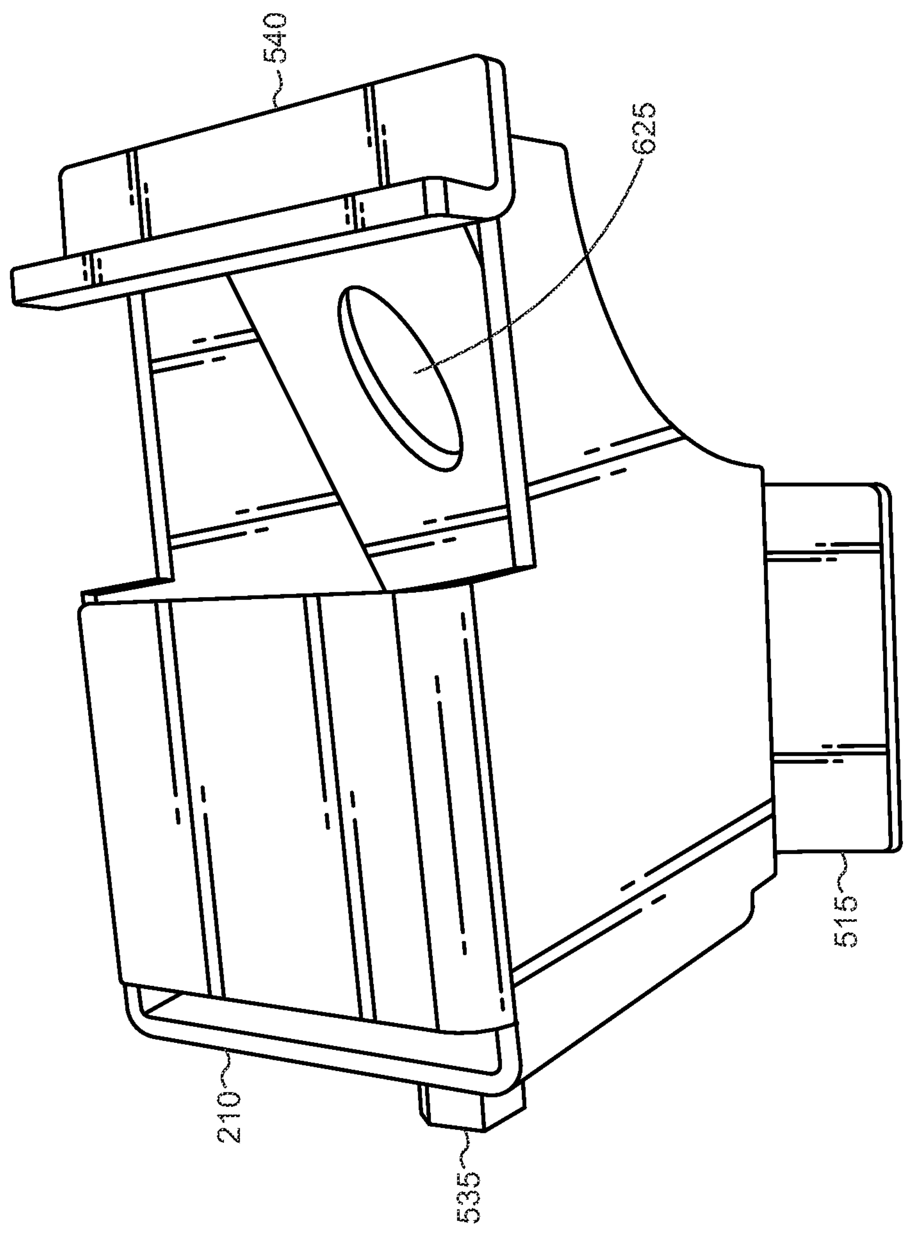

FIGS. 9-11 show illustrative representations in which the pull clamp bolt 535 can adjustably interact with the pull clamp 540 based on the amount of space necessary to engage with a given solar panel or solar panel flange. The space between both longitudinal ends of the pull clamp illustrates the various sizes a given solar panel flange may need to engage with the pull clamp. Additional space can be given to large solar panel flanges, and less space can be given to smaller flanges. The necessary size used can be adjusted based on the amount of tightening of the pull clamp bolt 535. This also applies to the pull clamp for the top support member 205. Any discussion with respect to the pull clamp's functionality for the top and bottom support members applies to each support member.

Figure 13:
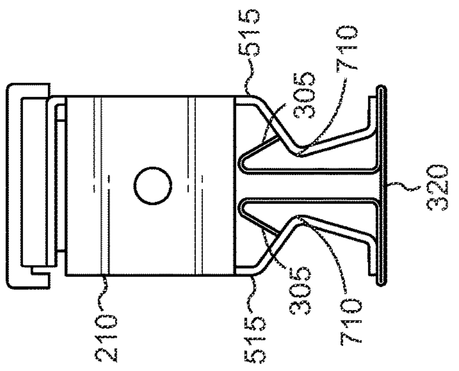
FIGS. 12 and 13 show illustrative representations of the bottom support member engaging and clipping into the rail's arms.
Figure 12:
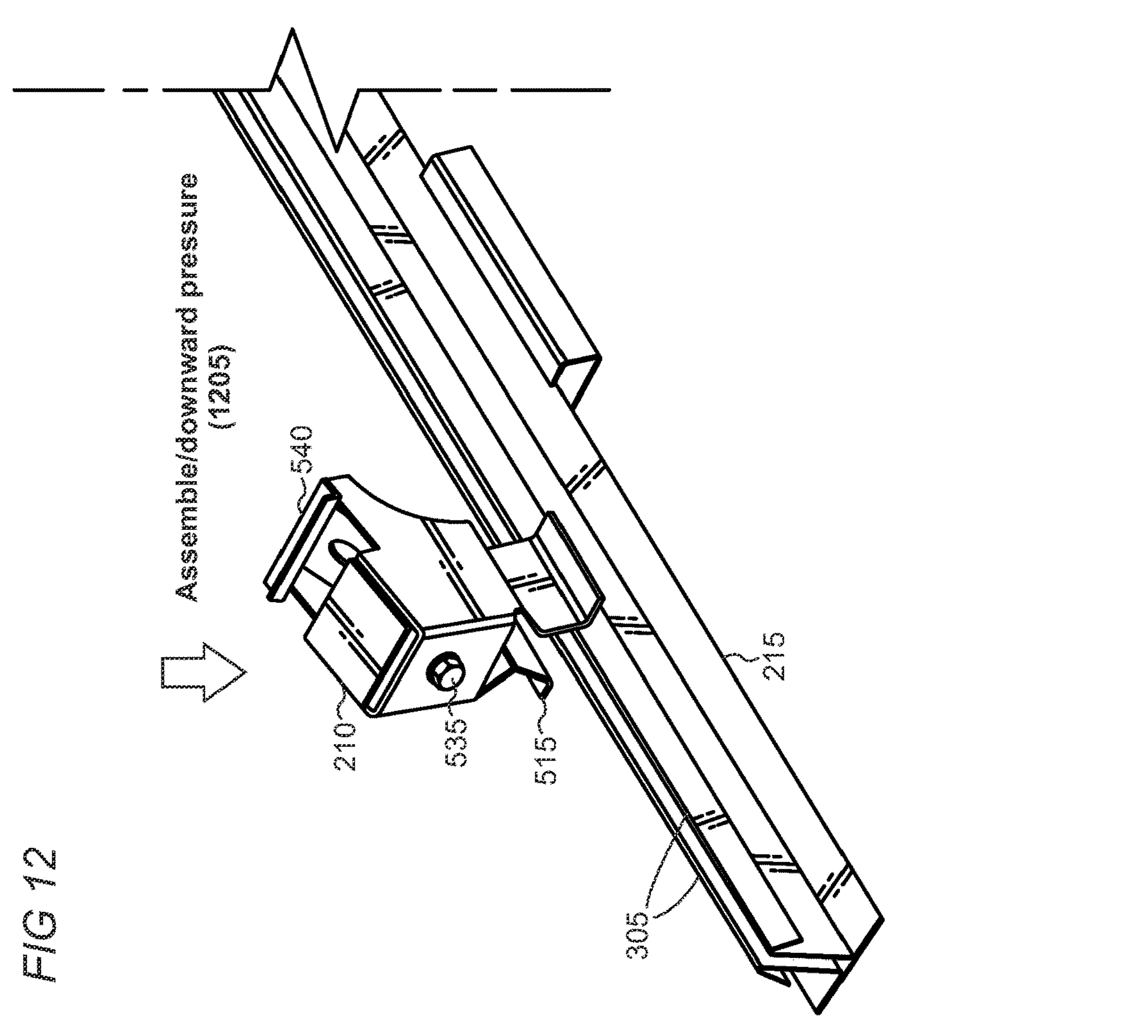

FIGS. 12 and 13 show illustrative representations in which users can apply downward pressure 1205 on the bottom support member 210 to assemble it with the rail 215. Similar to the discussion regarding the top support member's connection to the rail (FIGS. 7A-B), the bottom support's legs 515 each respectively engage with the rail's arms 305 until they lock in. The bottom support's legs and the rail's arms each have some bendability and give so the legs can wrap around and lock into the arms. The bendability may occur at the bent sections of the arms and legs which may have less dense composition. Once the arms get past the legs' innermost points 710, the ends of the arms engage with the inside portion of the legs.

FIG. 14 shows an illustrative representation in which a solar panel 220 and its flanges 1415 engage with and lock into place with the top and bottom support members 205, 210. As shown on both ends of the solar panel rack, the solar panel locks into place similarly for the top and bottom support members. A flange 1415 is secured to the exterior ends of the solar panel 220. The pull clamp 540, at nook 545, mates and engages with the bottom portion of the flange. The pull clamp bolt 535 is tightened into place, and an opposing press-fit or other nut 1425 is fastened to the opposite end of the pull clamp bolt 535 to tighten the structure together. The pull clamp bolt is fully tightened after the pull clamp is wrapped around the flange 1415, i.e., the flange is positioned within the nook 545 of the pull clamp. This way, the pull clamp and support members are sufficiently tightened so the flange and its attached solar panel 220 are secured in place and cannot meaningfully move. A user may rely on the access hole 625 (FIGS. 6, 8-10) to tighten a nut 1425, if necessary. The nut 1425 may be, for example, a press-fit nut that is attached to the access hole 625. As shown in FIG. 14, when the pull clamp bolt 535 is centrally inserted into the hole 620, it is directly aligned with the access hole 625 on the pull clamp's middle connector. Disassembling the solar panel 220 from the solar panel rack 105 can be done by loosening the pull clamp bolt 535, or the press-fit nut 1425 from the structure. In this regard, since the pull clamp bolt 535 is aligned with the access hole, the press-fit bolt 1425 can be pre-installed and attached to that access hole to facilitate easier installation. The press-fit bolt may be, for example, welded at its perimeter to the access hole's perimeter. However, in other embodiments, a typical nut may be used that engages with the access hole when the user tightens the nut to the pull clamp bolt.

The full schematic representation of the pull clamp's and support member's relation to the solar panel 220 and its flange 1415 illustrate the notable structural configuration of the pull clamp's design features. For example, the pull clamp has a support member connector 1445 that connects the pull clamp to the top or bottom support members 205, 210. The support member connector 1445 is attached to a middle connector 1440 that enables a reach from the support member connector, and thereby the top or bottom support member, to the flange connector 1435. As the flange connector latches and hooks onto the solar panel's flange 1415, the parts of the pull clamp effectively attach the solar panel 220 to the top or bottom support member. An acute angle is formed between the flange connector and the middle connector, which is the nook 545 that latches onto the flange. For disassembly, a user may loosen the pull clamp bolt 535 and the press-fit nut 1425 to enable a user to move the pull clamp away from the flange. The pull clamp's tab 1430 gives the user a point to grasp the pull clamp during assembly or disassembly. An acute angle is likewise shown between the support member connector 1445 and the middle connector 1440. The specific angles on both sides of the middle connector are utilized to create a direct connection between the respective top or bottom support member and the solar panel's flange. However, alternative angles may also be used in other setups and configurations, such as right angles, obtuse angles, etc. Put differently, the specific angle or angles used at the pull clamp are to create a connection from the top or bottom support members to the solar panel's flange, mounting bracket, etc.

The top portions of the top and bottom support members 205, 210 may be configured with teeth 715 that directly engage with an end of the solar panel 220. The module flange 1415 may be comprised of an aluminum material that enables the steel teeth on the top support member to initially pierce the flange and then pierce the solar panel. Specifically, the support member's teeth pierce the anodized layer of the solar panel, creating an electrical bond between the solar panel module and the solar panel racking system 105. This creates an electric connection by which an electric current can pass, such as to a battery storage source connected to the solar panel rack.

FIG. 14 also shows a ballast tray 1410, which attaches perpendicularly between two adjacent rails 215. Ballast trays may be secured in place using a mounting bracket, bolts or screws to ensure that the trays are securely in place. Once installed, ballasts 1405 are propped onto the ballast trays to prevent the solar panel rack 105 from moving.

Figure 15:
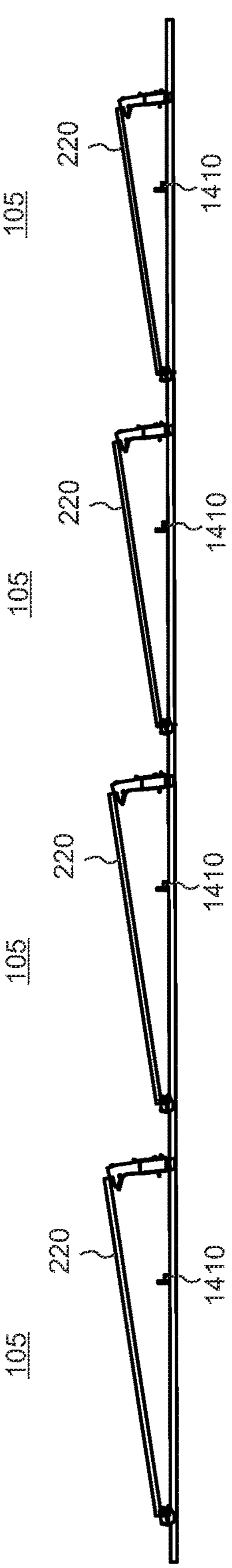
FIG. 15 shows an illustrative representation of a series of assembled solar panel racks with solar panels attached thereto.
Figure 16:
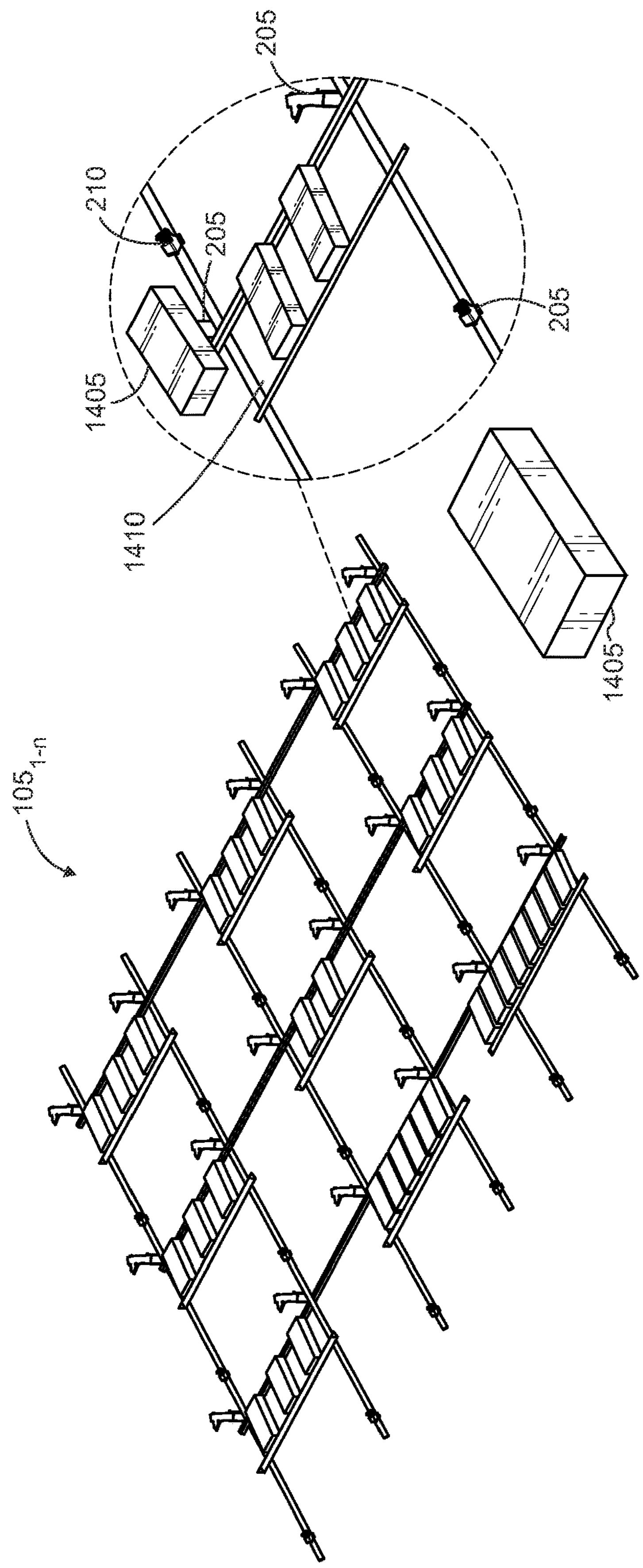
FIG. 16 shows an illustrative representation of solar panel racks with assembled ballast trays and ballasts.

FIG. 15 shows an illustrative arrangement of solar panel racks 105 adjacently positioned, showing that multiple racks and solar panels 220 operate in tandem to create an effective and green power generation solution. Multiple solar panel racks may be attached to rails which are longitudinally connected to each other. Likewise, FIG. 16 shows another illustrative arrangement of various solar panel racks, with the solar panels 220 removed for clarity in exposition. As shown, solar panel racks can be arranged vertically and horizontally to each other to leverage as much space as possible. Each solar panel rack may be configured similarly as discussed above regarding the top and bottom support members 205, 210, the pull clamps 540, ballast trays 1410 and ballasts 1405.

Various exemplary embodiments are disclosed herein. In one exemplary embodiment, disclosed is a pull clamp, comprising: a support member connector; a middle connector attached to the support member connector; and a flange connector attached to the middle connector, wherein the flange connector is attached to a tab that extends from an end of the flange connector opposite the middle connector.

In another example, the support member connector includes a hole. As another example, the support member connector's hole is adapted to receive a bolt or screw. As another example, the middle connector includes a hole. In another example, when a fastener centrally engages with the support member connector's hole, the fastener is likewise aligned with the middle connector's hole. In another example, the fastener is a bolt or screw. In a further example, a nut that tightens and secures to an end of the fastener that enters the support member connector. In another example, the nut is a press-fit nut pre-installed at the middle connector's hole. As another example, an acute angle is formed at a connection point between the middle connector and the flange connector, the acute angle forming a nook. As another example, an acute angle is formed at a connection point between the middle connector and the support member connector. In another example, the flange connector's nook engages with a flange attached to a solar panel.

In another exemplary embodiment, disclosed is a support member for solar panels, comprising: an adjustable upper support having an adjustment hole adapted to receive a fastener; a static sleeve having an inside channel into which the adjustable upper support enters, the static sleeve further having an elongated opening adapted to receive the fastener which, upon receiving the fastener, enters the adjustment hole.

In another example, notches on an outside surface of the static sleeve and which are positioned adjacent to the elongated opening. As a further example, a nut-like protrusion extending from the adjustment hole into an inside area of the adjustable upper support. In another example, the adjustment hole is threaded. As another example, the static sleeve includes legs at its bottom to attach to a base. As another example, the adjustable upper support includes one or more teeth that face outward to pierce a solar panel.

In another exemplary embodiment, disclosed is a rail to provide a support base to a solar panel rack, comprising: a base forming a substantial plane; a vertical section extending upward from the base; and a leg extending at an acute angle, relative to the vertical section, at a top portion of the vertical section.

In another example, the leg bends from the vertical section. In a further example, an opposing base, an opposing vertical section, and an opposing leg each of which forms a mirror image of the base, vertical section, and leg, and wherein the opposing base, vertical section, and leg are separated by a channel. As another example, a support member has corresponding legs that engage with the arms. In another example, the legs have an innermost point extends beyond an end of the legs to interlock the legs and arms. As a further example, a bore on a channel base of the channel. In another example, a splice having a stud for entering the channel's bore to connect two rails together. As another example, a nut that engages with the stud on an opposing side of the rail. As another example, the splice includes a flat surface that engages with a bottom surface of the rail.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A pull clamp for a solar panel rack, comprising:

a support member connector forming a flat plane, wherein the support member connector includes a hole;

a middle connector attached to the support member connector, wherein the middle connector forms a flat plane and the middle connector includes an access hole, in which the middle connector hole on the middle connector is formed at a different directional plane relative to the support member connector's hole; and a flange connector attached to the middle connector, wherein the flange connector is attached to a tab that extends from an end of the flange connector opposite the middle connector, the tab extending in a corresponding direction as the support member connector's flat plane, and wherein angles between the middle connector and support member connector and the middle connector and the flange connector each form an acute angle relative to the middle connector's flat plane.

2. The pull clamp of claim 1, wherein the support member connector includes a hole.

3. The pull clamp of claim 2, wherein the support member connector's hole is adapted to receive a bolt or screw.

4. The pull clamp of claim 3, wherein the middle connector includes an access hole.

5. The pull clamp of claim 4, wherein, when a fastener centrally engages with the support member connector's hole, the fastener is likewise aligned with the middle connector's access hole.

6. The pull clamp of claim 5, wherein the fastener is a bolt or screw.

7. The pull clamp of claim 5, further comprising a nut that tightens and secures to an end of the fastener that enters the support member connector.

8. The pull clamp of claim 7, wherein the nut is a press-fit nut pre-installed from the middle connector's access hole.

9. The pull clamp of claim 1, wherein the flange connector engages with a flange attached to a solar panel.

* * * * *